United States Patent [19]

Shum

[11] Patent Number: 4,499,784
[45] Date of Patent: Feb. 19, 1985

[54] SPLIT-BALL TYPE WRIST AND MANIPULATING ASSEMBLY FOR ROBOT

[75] Inventor: Lanson Y. Shum, Salem Twp., Westmorelnd County, Pa.

[73] Assignee: Westinghouse Electric Corp., Pittsburgh, Pa.

[21] Appl. No.: 323,640

[22] Filed: Nov. 20, 1981

[51] Int. Cl.³ ............................................. G05G 11/00
[52] U.S. Cl. ...................................... 74/479; 901/29; 414/5; 414/735
[58] Field of Search ...................... 74/749; 414/735, 4, 414/5; 403/160; 285/265, 184, 181; 464/106, 110; 901/29, 38

[56] References Cited

U.S. PATENT DOCUMENTS

| | | | |
|---|---|---|---|
| 3,272,347 | 9/1966 | Lemelson | 901/23 |
| 3,602,059 | 8/1971 | Jupe | 74/469 |
| 3,631,737 | 1/1972 | Wells | 74/469 |
| 3,922,930 | 12/1975 | Fletcher et al. | 74/665.8 |
| 3,985,238 | 10/1976 | Nakura et al. | 74/417 |
| 4,068,536 | 1/1978 | Stackhouse | 74/417 |
| 4,246,661 | 1/1981 | Pinson | 901/29 |
| 4,353,677 | 10/1982 | Susnjara et al. | 414/4 |
| 4,365,928 | 12/1982 | Baily | 414/735 |
| 4,402,234 | 9/1983 | Malarz et al. | 285/184 |

FOREIGN PATENT DOCUMENTS 0512048  6/1976  U.S.S.R. ............................... 901/29

Primary Examiner—Lawrence J. Staab
Assistant Examiner—Michael J. Gonet
Attorney, Agent, or Firm—E. C. Arenz

[57] ABSTRACT

A split-ball type wrist and manipulator assembly (FIG. 6) includes a first ball portion 2, a second ball portion 4 rotatable independently and relative to the first ball portion, and end effector 52 rotatably carried by the second ball portion 4, the first ball portion 2 being controlled in its rotation by the hollow outer shaft 38, the second ball portion 4 being controlled in its rotation by rotation of an inner shaft 39 coupled to the second ball portion by the hollow, flexible coupling 45, and the end effector rotation being controlled by the innermost hollow shaft 42 rotation connected to the end effector by the inner flexible coupling 53, and with power line means 58 for controlling tool operation extending totally internally of the wrist and arm to the source of power.

2 Claims, 7 Drawing Figures

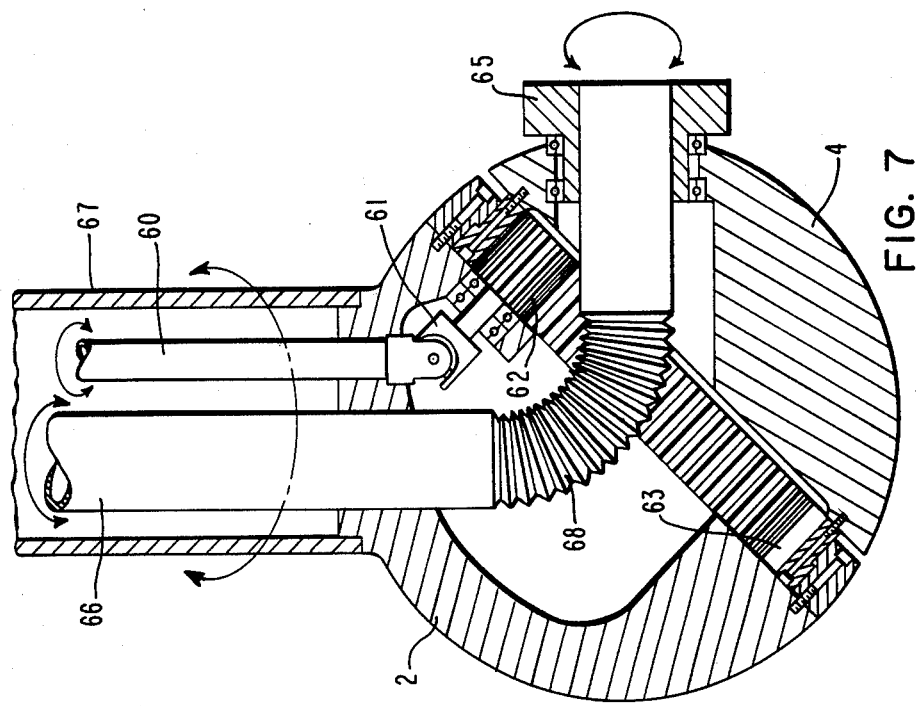
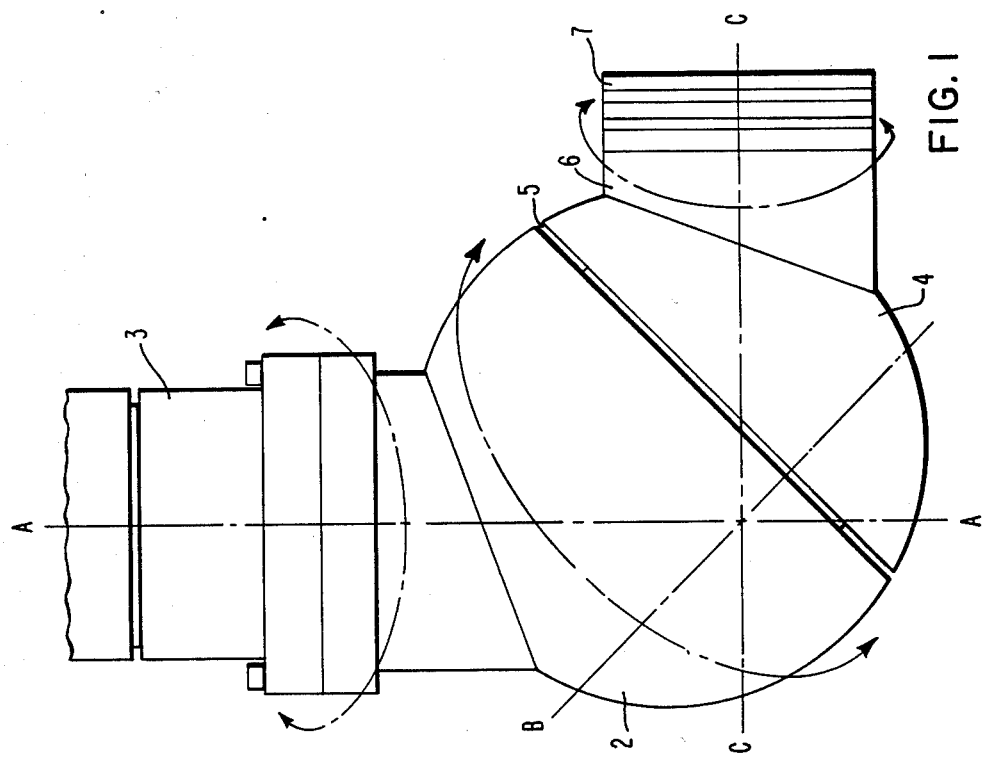

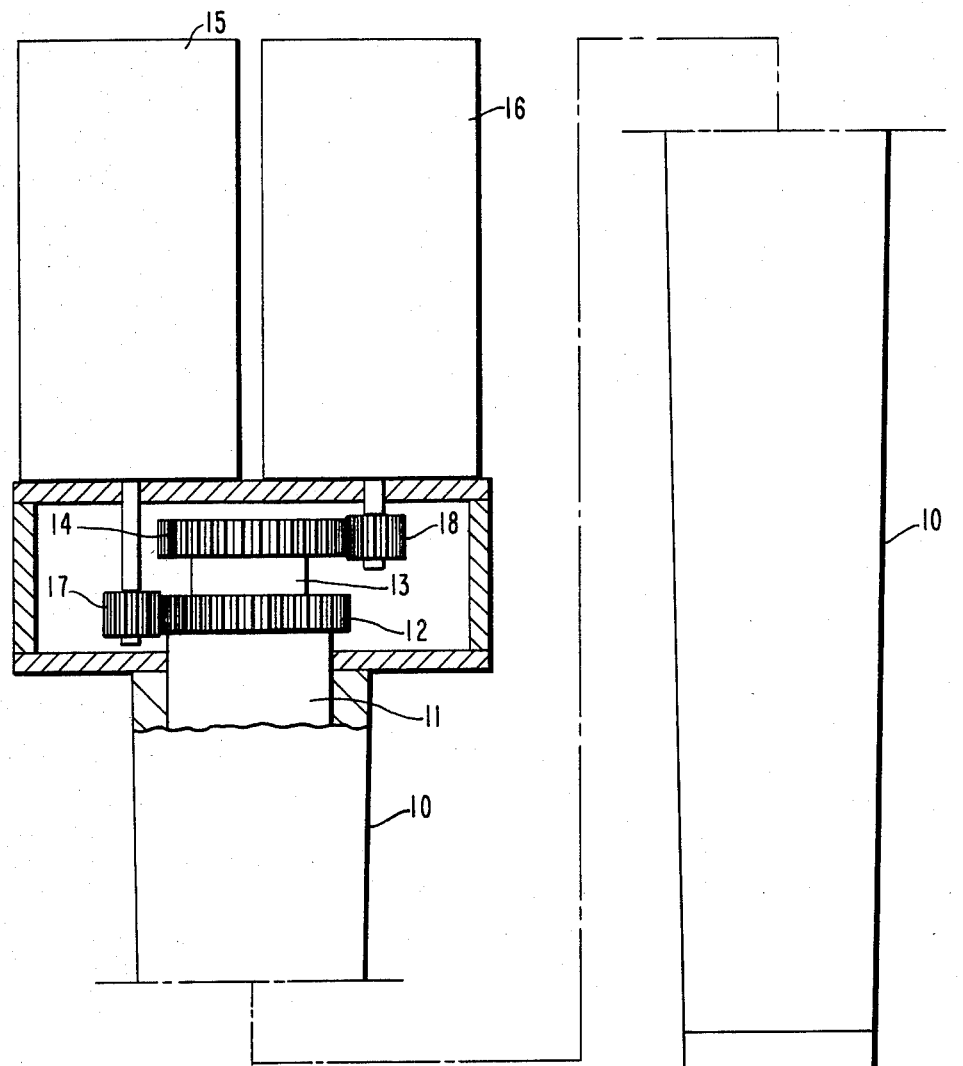
FIG. 3
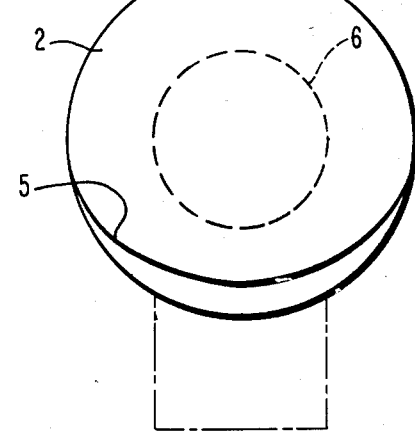

SPLIT-BALL TYPE WRIST AND MANIPULATING ASSEMBLY FOR ROBOT

BACKGROUND OF THE INVENTION

1. Field of the Invention:

The invention pertains generally to the art of robotics and in particular to that part of the art which pertains to multi-axis wrist designs.

2. Description of the Prior Art:

The closest prior art of which I am aware is found in U.S. Pat. No. 4,068,536 which discloses a wrist of the type which I call a split-ball type, and in which a first portion of the ball is rotatable about one axis, while a second portion of the ball is rotatable relative to the first portion about another axis, and the end effector carried by the second portion of the ball is rotatable about its axis. As is stated in connection with the ability of the device of that patent to perform, such a device generates an imaginary spherical sector as it is rotated through space, is capable of orientating a part normal to any point on the generated spherical sector and with this capability thus eliminates "holes" or "voids" in the spatial orientation of the end effector and increases the manipulator's flexibility.

A split-ball type wrist and manipulator assembly according to my invention has the same capability in a three-axis form and, further, in both its two and three-axis form is considered to have advantages in its construction and in particular with respect to the construction permitting the running of power line means such as electrical cables and air hoses completely internally through the arm and through the wrist to the end effector.

SUMMARY OF THE INVENTION

In accordance with the invention, a split-ball type wrist and manipulator assembly at the end of an arm includes at least a first ball portion and a second ball portion rotatably carried by the first ball portion, and an end effector carried by the second ball portion, and in which the improvement comprises first hollow means fixedly connected to the first ball portion for rotation thereof, and the second means disposed interiorly of the first hollow means and including means connecting it to the second ball portion to rotate the second ball portion relative to and independently of rotation of the first ball portion, line means are provided to power the end effector, and the first hollow means and the split-ball wrist both define interior hollow spaces adequate to accommodate both the second means and the connecting means thereof and the line means extending through the hollow spaces to the end effector.

In one preferred form of the invention for certain applications, the end effector is rotatable about its longitudinal axis relative to the second ball portion, and hollow, flexible coupling means connects a hollow tubular member in the arm to the end effector for rotation thereof, with the power line means extending through the hollow tubular member and the flexible coupling.

BRIEF DESCRIPTION OF THE DRAWINGS

FIG. 1 is a schematic elevational view of a three-axis wrist of the split-ball type;

FIG. 3 is a top view of the device of FIG. 2;

FIG. 7 is a schematic view in the nature of a section through a three-axis wrist in which a hollow, flexible coupling is used only to connect the end effector.

DESCRIPTION OF THE PREFERRED EMBODIMENTS

Figure 2:
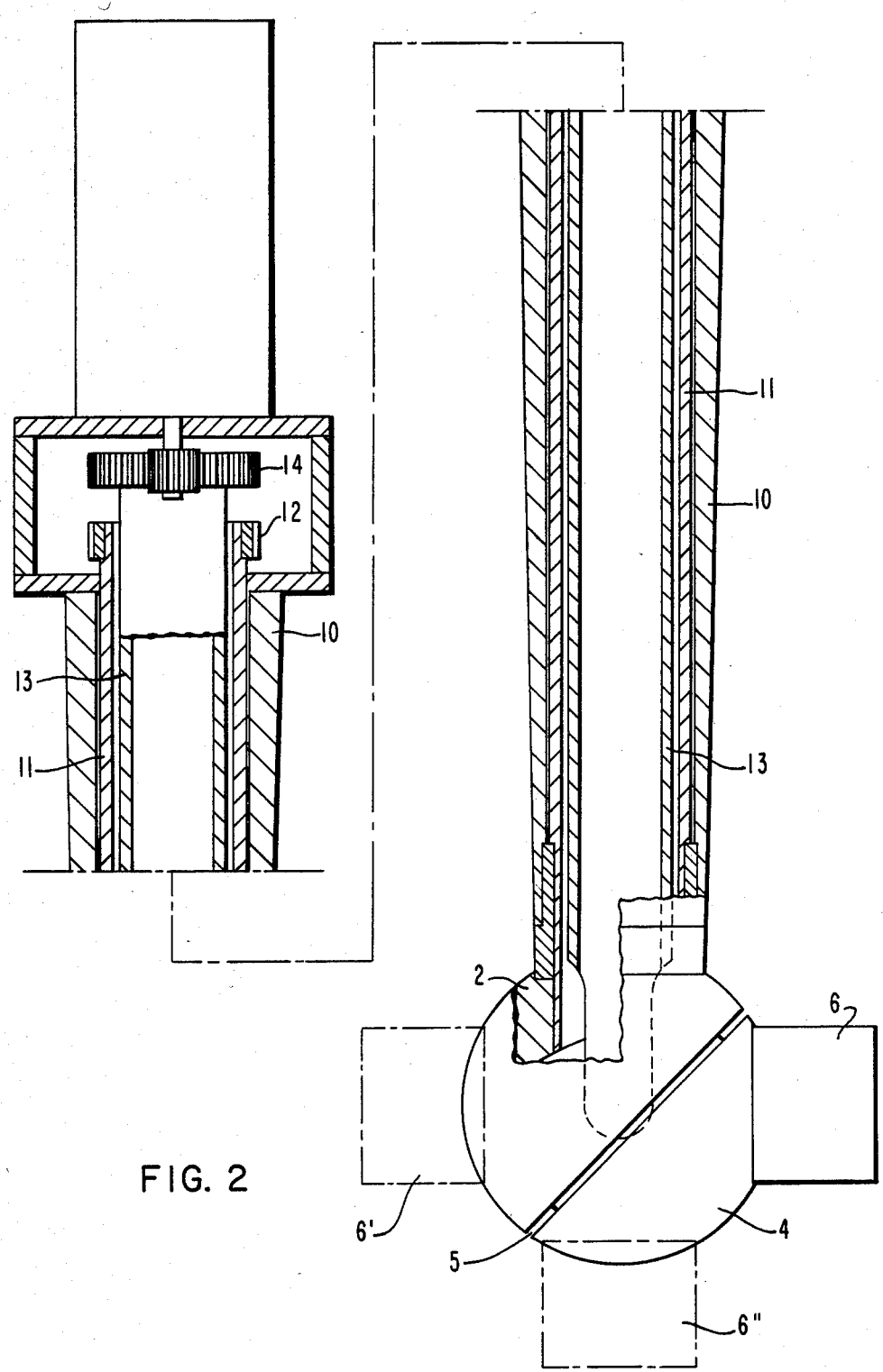
FIG. 2 is a partly broken elevational view of an arm and wrist having a construction according to one form of the invention.

FIG. 1 is intended to facilitate the general understanding of the motions of the parts of a three-axis, split-ball wrist. The first portion 2 of the split ball is fixedly connected to the member 3. The second portion or segment 4 of the ball which is split along the line 5 is rotatably carried by the first portion of the ball. The second segment of the ball 4 carries a fixed projection 6 which in turn supports a rotatable end effector 7 diagrammatically shown in FIG. 1.

With the parts positioned as shown in FIG. 1, rotation of the member 3 and connected ball portion results in rotation of all the parts about the A—A axis. Such rotation changes the orientation of both the B—B and C—C axis of course. Rotation of the second ball portion 4 (through internal means not shown) will result in rotation of the second ball portion about the axis B—B, and a reorientation of the C—C axis. Rotation of the second ball portion about the B—B axis results only in reorientation of the C—C axis.

Finally, the end effector 7 may itself be rotated through other internal means about the C—C axis. It will thus be appreciated that with the movements of the parts about the A and B axis, the disposition of the end effector 7 may be carried to anywhere within a hemisphere. Additionally, the rotation of the end effector 7 about the C axis permits rotation of whatever tool is carried by the end effector throughout 360°.

It will be appreciated that if the plane of the split 5 is inclined to an angle closer than 45° to the A axis, the coverage of the tool can be extended beyond a hemisphere.

In some instances, rotation of the end effector about the C axis will be unnecessary, and in such a case the wrist is adapted only for rotation about the A and B axis.

The device which will be described in somewhat more detail in connection with FIGS. 2-5 is of the two-axis character.

Referring to FIGS. 2 and 3, the basic overall arrangement of a two-axis wrist at the end of an arm, with the actuating means for the two ball portions, is illustrated. The parts in FIGS. 2 and 3 which correspond to those of FIG. 1 are given identical numerals. Referring particularly to FIG. 2, the generally cylindrical housing arm 10 contains first hollow means 11 fixedly connected to the first ball portion 2 at one end and carrying a spur gear 12 at its other end. A second hollow means 13 is disposed interiorly of the member 11 and includes means (not shown in FIGS. 2 and 3) for effecting rotation of the second ball portion 4 relative to the first ball portion 2, and at its other end carrying a spur gear 14.

Referring to FIG. 3, suitable motors or other actuators 15 and 16 are connected to drive the spur gears 12 and 14 through the meshing gears 17 and 18, respectively.

Rotation of the first hollow member 11 effecting rotation of the first ball portion 2 can move the projection 6 to the dotted line position 6' for example. Rotation of the second hollow member 13 (through means not shown coupled to the second ball portion 4) can effect rotation of the projection to the 6" position. The connecting means arrangement for the second ball portion 4 will be explained in connection with FIGS. 4 and 5.

Figure 4:
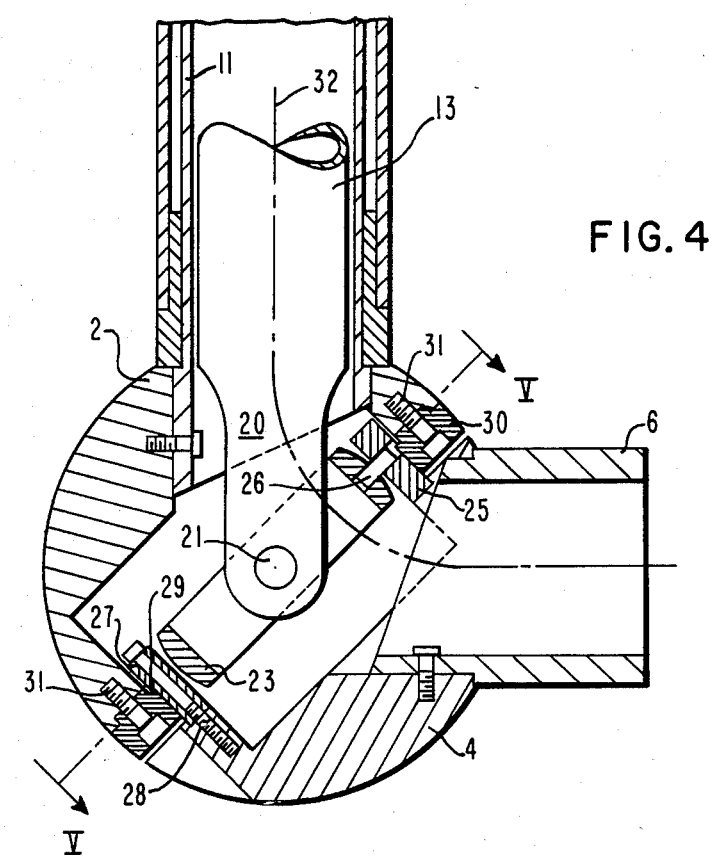
FIG. 4 is a detailed sectional view of the wrist portion of the device of FIGS. 2 and 3.
Figure 5:
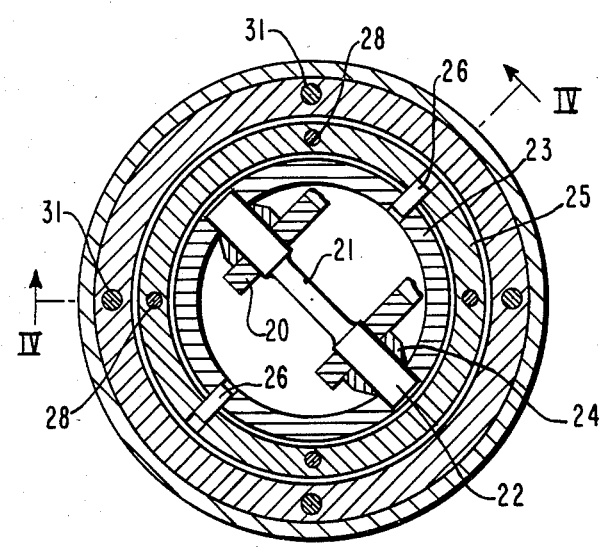
FIG. 5 is a sectional view corresponding to one taken along the line 5—5 of FIG. 4.

Referring now to FIGS. 4 and 5, one preferred arrangement for effecting the connection between the second rotating means 13 and the second ball portion 4 is illustrated along with other construction details of a two-axis wrist. The end 20 of the hollow tubular member 13, and which extends into the wrist is clevis-shaped by virtue of the removal of material along the diametrically opposite side walls of the member 13 near its end. The clevis end 20 (FIG. 5) carries a pin 21 having opposite ends which project into diametrically opposite bores 22 of an inner ring 23. Spacers 24 maintain the clevis centered relative to the ring's circumference. The inner ring 23 is in pivotal relation relative to the pin 21 and/or clevis 20. An outer ring 25 is pivotally supported from the inner ring by pins 26 carried by the inner ring in bores which are provided in the inner ring on an axis perpendicular to the axis of the bores 22. With the axis for the pin 21 and pins 26 being at right angles to each other, the rings may be said to be secured in a gimballed relation, or may be considered to form a universal joint.

The outer ring 25 (FIG. 5) is provided with a series of circumferentially spaced bores 27 extending in a direction parallel to the longitudinal axis of the outer ring. Fasteners such as machine screws 28 (FIG. 4) secure the outer ring to the second ball portion as may be seen at the location of one machine screw 28 in FIG. 4. The outer ring 25 is provided with a circumferential shoulder as at 29 which provides a bearing face opposing a corresponding bearing face on the bearing retainer 30 which is fastened to the rim of the first ball portion 2 by the screws 31.

Now regarding the motions of the parts as the second ball portion 4 is rotated relative to the first ball portion 2, as the inner tubular member 13 is rotated the outer ring will track in the plane defined by the face and shoulders between the outer ring and the bearing retainer. The pin 21 on the clevis will remain in the plane of the axis of the pin, and the inner ring will correspondingly move from positions of alignment with the outer ring to positions out of alignment with the outer ring.

In accordance with one important aspect of the invention, the line means, such as electrical and/or pneumatic lines, for powering an end actuator (not shown in FIG. 4), can pass to the end effector internally through the tubular member 13 in the arm portion of the assembly and through the split-ball wrist portion through the hollow inner ring 21. The general path of such power line means is indicated in FIG. 4 by the heavy dash line 32.

Figure 6:
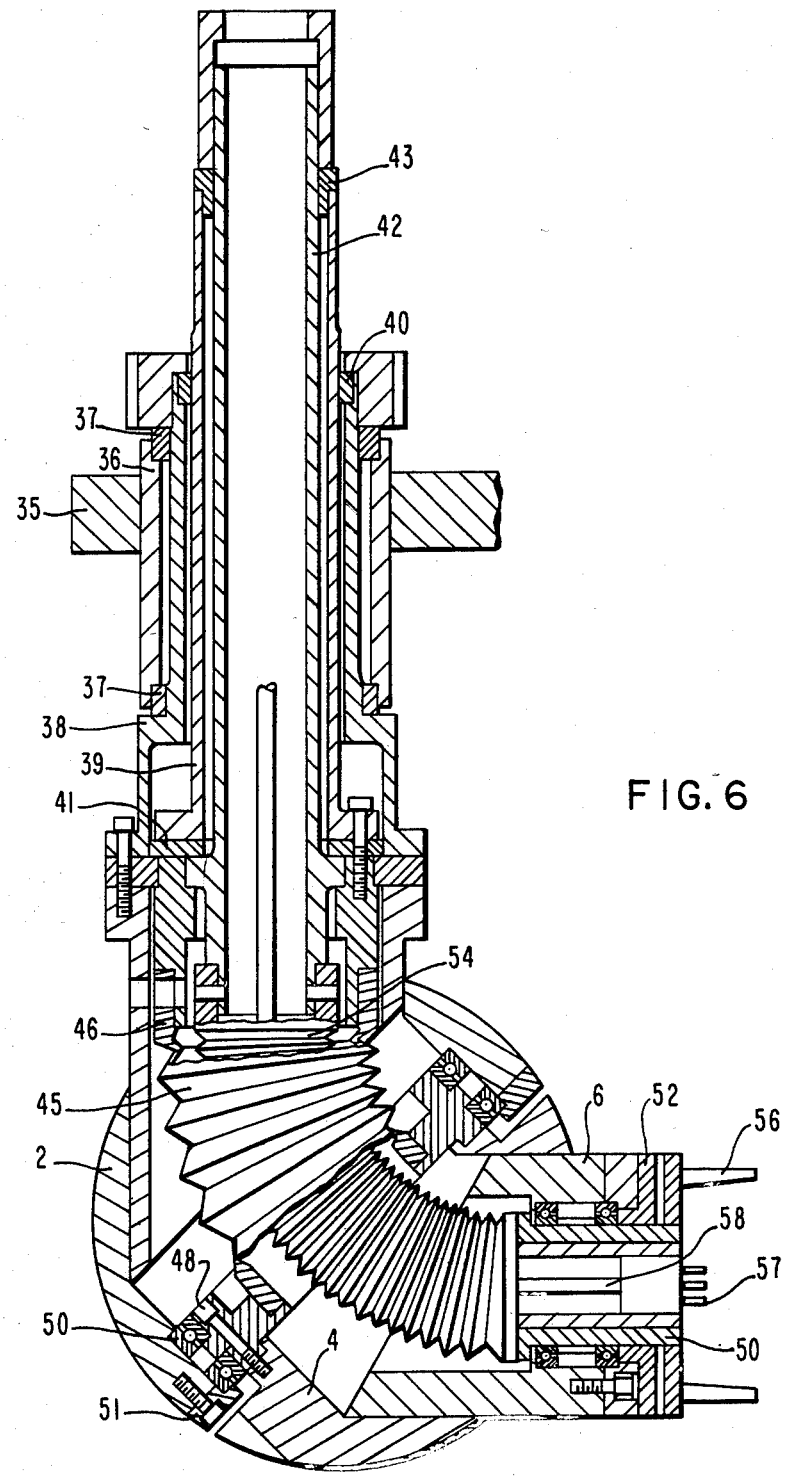
FIG. 6 is a sectional view of a three-axis wrist provided with flexible couplings for transmitting motions for components rotatable about two of the axes.

In FIG. 6 a three-axis, split-ball type wrist and manipulator assembly is illustrated in which hollow, flexible, bellows-like couplings are used for transmitting rotation to the end effector and to the second ball portion. In FIG. 6, a stand 35 carries a bearing housing 36 within which two annular bearings 37 at the ends of the housing support the first hollow shaft means 38 for rotation relative to the housing.

A second hollow shaft means 39 is rotatably supported relative to the outer hollow member 38 and internally thereof, through ring bearing 40 and a ring spacer 41.

A third and innermost hollow member 42 is rotatably supported relative to the second hollow member 39 and internally thereof by the bearings 43 and the spacer 41 arrangement.

The first and outer hollow shaft 38 is fastened to the first ball portion 2 so that rotation of the hollow shaft 38 effects rotation of the hollow ball portion 2 about the longitudinal axis of the outer shaft 38. The second ball portion 4 is rotated relative to the first ball portion 2 in accordance with the rotation of the hollow shaft 39 which is connected to the second ball portion through a hollow, flexible, bellows-like coupling 45 which has one end 46 attached to the end of the tubular shaft 39 adjacent the wrist. The other end 47 of the flexible coupling is attached to a ring 48 which in turn is fastened to the second ball portion 4 through machine screw fasteners or similar fasteners 49. The rotatable relation of the second ball portion to the first is accomplished through the use of a bearing assembly 50 between the ring 48 and the first ball portion 2, this bearing assembly 50 being held in place relative to the first ball through the bearing retainer 51 arranged similarly to that arrangement shown in FIGS. 4 and 5.

The end effector 52 is rotatably carried in the nozzle-shaped projection 6 which is fixed to the second ball portion 4. A second flexible coupling 53, which is similar to the first coupling 45 but smaller in diameter and longer, has its end 54 attached to an end of the innermost hollow member 42 and has its other end 55 attached to the rotatable end effector 52.

The end effector will typically be provided with means as at 56 to receive whatever tool may be used in the application of the robot. Additionally, the end effector carries plug means 57 to which, for example, hydraulic and/or electrical lines 58 provide power for the operation of the tool as well as to provide for engagement and disengagement thereof automatically if desired. These lines 58 extend as shown in FIG. 6 internally through the wrist, through the internal flexible coupling 53 and through the internal hollow shaft 42 to a controlled power source.

In FIG. 7 another arrangement partaking of the concept of the invention is illustrated in schematic form. In this arrangement the second ball portion 4 is rotated through a drive means including a shaft 60 having a universal joint 61 coupled to a spur gear 62 which, in turn, drives the centrally open gear 63 attached to the second ball portion 4 at an outer margin. The rotatable end effector 65 carried by the second ball portion 4 is driven by the hollow shaft 66 located interiorly of the outer rotatable hollow shaft 67, and coupled to the end effector through the hollow, flexible, bellows-like, coupling 68.

The second drive means 60 is offset from the central axis of the outer hollow shaft 67 while the inner hollow shaft 66 preferably extends along that axis. Power line means can extend through the hollow shaft 66 and the flexible coupling 68 to the end effector to power the tool and its engagement and disengagement.

Thus in accordance with the broader concept of the invention it is not necessary that all of the driving devices be in concentric relation within the outer rotatable drive member but rather that the outer rotatable drive means and the split-ball wrist both define interior hollow spaces adequate to accommodate whatever internal drive means and connections are provided and at the same time permit the line means to extend through these hollow spaces to the end effector.

Some of the advantages of the arrangement according to the invention is that the assembly is relatively compact permitting the wrist to get into tight places which is important for applications such as arc welding, press loading and nuclear service operations. The arrangement permits the motor drives to be remotely situated at the end of the arm opposite the wrist allowing for more payload at the wrist end. And, as has been stated before, the arrangement is such that it permits all of the power lines to the end effector to be housed internally of the arm and wrist so that the lines are protected from any hostile environment.

While some currently available flexibly couplings, such as those of nylon material, have some springiness with respect to the degree of rotation from one end of the coupling to the other, in a number of applications high precision in that respect is not necessary.

What is claimed is:

1. In a split-ball type wrist and manipulator assembly at one end of an arm, the assembly including at least a first ball portion and a second ball portion rotatably carried by the first ball portion, and an end effector carried by said second ball portion, the improvement comprising:

first hollow means fixedly connected to said first ball portion for rotation thereof;

second means disposed interiorly of said first hollow means and including means connecting it to said second ball portion to rotate said second ball portion relative to and independently of rotation of said first ball portion;

physically solid, flexible line means to power said end effector;

said first hollow means and split-ball wrist both defining interior hollow spaces adequate to accommodate both said second means and said connecting means thereof;

said line means extending through said hollow spaces to said end effector so that all of said powering line means are interiorly of said arm and wrist;

said second means comprises a hollow tubular member extending through said first hollow means and having said line means extending in said hollow tubular member; and said connecting means of said second means includes an inner and an outer ring attached to each other along one diametral axis, the outer ring being attached to said second ball portion to effect rotation thereof in accordance with rotation of said outer ring, and said tubular member includes an end in said wrist and pivotally connected to said inner ring along another diametral axis perpendicular to said one diametral axis so that said rings are in gimballed relation.

2. An assembly according to claim 1 wherein:

said line means extends through said inner ring to said end effector.

* * * * *